United States Patent
Morrison

(10) Patent No.: US 9,764,822 B2
(45) Date of Patent: Sep. 19, 2017

(54) CLEAN FUEL ELECTRIC MULTIROTOR AIRCRAFT FOR PERSONAL AIR TRANSPORTATION AND MANNED OR UNMANNED OPERATION

(71) Applicant: Alakai Technologies Corporation, Hopkinton, MA (US)

(72) Inventor: Brian D. Morrison, Hopkinton, MA (US)

(73) Assignee: Alakai Technologies Corporation, Hopkinton, MA (US)

( * ) Notice: Subject to any disclaimer, the term of this patent is extended or adjusted under 35 U.S.C. 154(b) by 186 days.

(21) Appl. No.: 14/699,945

(22) Filed: Apr. 29, 2015

(65) Prior Publication Data

US 2016/0200421 A1     Jul. 14, 2016

Related U.S. Application Data

(60) Provisional application No. 61/987,009, filed on May 1, 2014.

(51) Int. Cl.
   *B64C 27/08*        (2006.01)
   *B64C 13/18*        (2006.01)
   (Continued)

(52) U.S. Cl.
   CPC .............. *B64C 13/18* (2013.01); *B64C 27/08* (2013.01); *B64D 27/24* (2013.01); *G01C 23/00* (2013.01);
   (Continued)

(58) Field of Classification Search
   CPC .............. B64C 27/08; B64C 2201/005; B64C 2201/141; B64C 2201/042;
   (Continued)

(56) References Cited

U.S. PATENT DOCUMENTS 5,106,035 A     4/1992    Langford
6,314,366 B1   11/2001   Farmakis et al.
(Continued)

OTHER PUBLICATIONS

Notice of Allowance for U.S. Appl. No. 14/452,245, mailed Nov. 5, 2015.

(Continued)

*Primary Examiner* — Philip J Bonzell
(74) *Attorney, Agent, or Firm* — Sean D. Detweiler, Esq.; Morse, Barnes-Brown & Pendleton, P.C.

(57) ABSTRACT

Methods and systems for a full-scale vertical takeoff and landing manned or unmanned aircraft, having an all-electric, low-emission or zero-emission lift and propulsion system, an integrated 'highway in the sky' avionics system for navigation and guidance, a tablet-based motion command, or mission planning system to provide the operator with 'drive by wire' style direction control, and automatic on-board-capability to provide traffic awareness, weather display and collision avoidance. Automatic computer monitoring by a programmed triple-redundant digital autopilot computer controls each motor-controller and motor to produce pitch, bank, yaw and elevation, while simultaneously restricting the flight regime that the pilot can command, to protect the pilot from inadvertent potentially harmful acts that might lead to loss of control, or loss of vehicle stability. By using the results of the state measurements to inform motor control commands, the methods and systems contribute to the operational simplicity, reliability and safety of the vehicle.

22 Claims, 11 Drawing Sheets

(51) Int. Cl.
B64D 27/24 (2006.01)
G01C 23/00 (2006.01)
G05D 1/00 (2006.01)

(52) U.S. Cl.
CPC ............ G05D 1/0077 (2013.01); *Y02T 50/44* (2013.01); *Y02T 50/54* (2013.01); *Y02T 50/64* (2013.01)

(58) Field of Classification Search
CPC .. B64C 2201/066; B64D 27/24; B64D 35/04; B64D 35/06; B64D 2041/0054; B64D 2033/00; B64D 2041/005
See application file for complete search history.

(56) References Cited

U.S. PATENT DOCUMENTS

| | | | |
|---|---|---|---|
| 9,242,728 B2* | 1/2016 | Morrison | ................ B64C 27/08 |
| 2007/0034738 A1 | 2/2007 | Sanders et al. | |
| 2011/0102198 A1 | 5/2011 | Deleris et al. | |
| 2012/0056040 A1 | 3/2012 | Brotherton-Ratcliffe | |
| 2012/0083945 A1 | 4/2012 | Oakley et al. | |
| 2014/0027564 A1 | 1/2014 | Mercer et al. | |
| 2014/0156134 A1* | 6/2014 | Cullinane | ............. B60W 30/00 701/23 |
| 2014/0339354 A1 | 11/2014 | Gaillimore | |
| 2015/0367950 A1* | 12/2015 | Rajashekara | ......... B64C 11/305 701/3 |

OTHER PUBLICATIONS

International Search Report for PCT/US2015/028345, dated Sep. 17, 2015.
Notice of Allowance for U.S. Appl. No. 14/452,245, dated Sep. 9, 2015.
Moore, "NASA Puffin electric Tailsitter VTOL Concept", Aerospace Engineer, Aeronautics Systems Analysis Branch, NASALangley, MS442, AIM Member, American Institute of Aeronautics and Astronautics, 2010.
NASA-Puffin Electric .VTOL-Concept-Cover. "The NASA Personal Puffin Flying Machine." (https://www.youtube.com/watch?v=Mc66-uEkEBk).
NASA-Puffin Electric-VTOL-Concept. (https://www.youtube.com/watch?feature=playerembedded&v=rhpPhvWvLgk).
Google search of nasa samarai hybrid-electric vtol. Downloaded May 31, 2015.
Non-Final Office Action for U.S. Appl. No. 14/452,245 mailed Jun. 4, 2015.

* cited by examiner

CLEAN FUEL ELECTRIC MULTIROTOR AIRCRAFT FOR PERSONAL AIR TRANSPORTATION AND MANNED OR UNMANNED OPERATION

CROSS-REFERENCE TO RELATED APPLICATION(S)

This application claims priority to, and the benefit of U.S. Provisional Application 61/987,009, filed May 1, 2014, for all subject matter common to both applications. The disclosure of said provisional application is hereby incorporated by reference in its entirety.

FIELD OF THE INVENTION

The present invention is directed to full-scale hybrid electric-powered (low or no emission) multirotor aircraft design, implementation and operation. It finds particular, although not exclusive, application to on-board Fuel Cell and/or Motor/Generator powered hybrid electric multirotor aircraft, where the motor-generator, fuel cell or other on-board source of power transforms fuel into electricity which is then used to operate multiple electric motors. The present invention is not designed for reduced scale or model aircraft, having unique capabilities, features, redundancy, safety and other features necessary to the reliability and safety of on-board passengers and optional operators that are necessary to maintain flight-worthiness. The multirotor aircraft may be operated in UAV or drone mode following either remote commands or a pre-programmed route to its destination, or it may be operated in operator mode when flown by an operator with skills equivalent to a typical automobile driver's license.

BACKGROUND

Although reduced scale multirotor aircraft (sometimes called multi-copters) are not new, they have been reduced scale models not intended for the rigors or requirements of carrying human passengers, and are mostly used either as toys, or for limited-duration surveillance or aerial photography missions with motion being controlled by radio-control remotes. Most if not all are battery powered. For example, US Patent Application 20120083945 relates specifically to a reduced scale multi-copier, but does not address the safety, structural, or redundancy features necessary for an FAA-certified passenger-carrying implementation, nor any of the systems required to implement a practical, passenger-carrying vehicle with fault-tolerance and state-variable analysis, nor any way of generating its own power from fuel carried on-board. The dynamics and integrity requirements of providing a full scale aircraft capable of safely and reliably carrying human passengers and operating within US and foreign airspace are significantly different that those of previous reduced scale models.

Therefore, a full scale multi-copter implementation that finds applications for commuting, for recreation, for inter-city transportation, for industrial, for delivery, or for security and surveillance applications among others with human passengers on board, based on state-of-the-art electric motor and electronics and computer technology with high reliability, safety, simplicity, and redundant control features, with on-board capability to generate its own electrical power (as opposed to simply consuming energy previously stored in electro-chemical batteries), coupled with advanced avionics and flight control techniques is described.

A large volume of personal travel today occurs by air. For destinations of more than 500 miles, it has historically been the fastest travel mode and, in terms of injuries per passenger mile, the safest. However, only about 200 hub and spoke airports exist within the US, placing much of the population more than 30 minutes away from an airport. Yet there are over 5,300 small control-towered regional airports, and over 19,000 small airfields with limited or no control towers throughout the US, placing more than 97% of the population within 15 to 30 minutes of an airfield. As many have noted before, this is a vastly under-utilized capability.

In the 21st Century, the opportunity is available to apply advanced technologies of the evolving National Airspace System (NAS) to enable more-distributed, decentralized travel in the three-dimensional airspace, leaving behind many of the constraints of the existing hub-and-spoke airport system, and the congestion of the 2-dimensional interstate and commuter highway systems.

Many large cities such as Boston, Houston, Los Angeles and other major metropolitan areas are virtually gridlocked by commuter traffic, with major arteries already at or above capacity, and with housing and existing businesses posing serious obstacles to widening or further construction. NASA, in its 'Life After Airliners' series of presentations (see Life After Airliners VI, EAA AirVenture 2003, Oshkosh, Wis. Aug. 3, 2003, and Life After Airliners VII, EAA AirVenture 2004, Oshkosh, Wis. Jul. 30, 2004) and NASA's Dr. Bruce Holmes (see Small Aircraft Transportation System—A Vision for 21st Century Transportation Alternatives, Dr. Bruce J. Holmes, NASA Langley Research Center. 2002) make the case for a future of aviation that is based on the hierarchical integration of Personal Air Vehicles (PAV), operating in an on-demand, disaggregated, distributed, point-to-point and scalable manner, to provide short haul air mobility. Such a system would rely heavily on the $21^{st}$ century integrated airspace, automation and technology rather than today's centralized, aggregated, hub-and-spoke system. The first, or lowest tier in this hierarchical vision are small, personal Air Mobility Vehicles or aircraft, allowing people to move efficiently and simply from point-to-any-point, without being restricted by ground transportation congestion or the availability of high-capability airports. Key requirements include reduced or eliminated noise impacts to communities, vehicle automation, operations in non-radar-equipped airspace and at non-towered facilities, green technologies for propulsion, increased safety and reliability, and en-route procedures and systems for integrated operation within the National Airspace System (NAS) or foreign equivalents. Ultimate goals cited by NASA include an automated self-operated aircraft, and a non-hydrocarbon-powered aircraft for intra-urban transportation. NASA predicts that, in time, up to 45% of all future miles traveled will be in Personal Air Vehicles.

This invention addresses part of the core vision established by NASA, and documents the concept and design of an clean-fueled, electric multirotor vehicle, referred to herein as a multirotor aircraft, or an e-copter, or an Air Mobility Vehicle, as one part of the On-Demand, Widely Distributed Point-to-Any Point $21^{st}$ Century Air Mobility system. Operation of the vehicle is simple and attractive to many operators when operating under Visual Flight Rules (VFR) in Class E or Class G airspace as identified by the Federal Aviation Administration, thus in most commuter situations not requiring any radio interactions with Air Traffic Control towers.

SUMMARY

The present invention relates to a full-scale vertical take-off and landing manned or unmanned aircraft having a lightweight airframe containing a system to generate electricity from fuels such as LPG, CNG, or hydrogen, an electric lift and propulsion system mounted to a lightweight multirotor upper truss or frame structure, counter-rotating pairs of AC or DC brushless electric motors each driving a propeller or rotor, an integrated 'highway in the sky' avionics system for navigation, a redundant autopilot system to manage motors and maintain vehicle stability, a tablet-computer-based mission planning and vehicle control system to provide the operator with the ability to pre-plan a route and have the system fly to the destination via autopilot or to directly control thrust, pitch, roll and yaw through movement of the tablet computer, and ADSB or ADSB-like capability to provide traffic and situational awareness, weather display and collision avoidance warnings. Power is provided by one or more on-board motor-generators for generating electrical voltage and current, or an on-board fuel cell for generating electrical voltage and current, electronics to monitor and control electrical generation, and motor controllers to control the commanded voltage and current to each motor and to measure its performance (which may include such metrics as resulting RPM, current, torque and temperature among others). As a multirotor electric aircraft, the vehicle does not fall into the standard 'fixed wing' or 'helicopter' or "lighter-than-air" categories, and may require a new classification scheme in coordination with the Federal Aviation Administration and foreign regulatory authorities.

The vehicle has no tail rotor, and lift is provided by pairs of small electric motors driving directly-connected pairs of counter-rotating propellers, also referred to as rotors. The use of counter-rotating propellers on each pair of motors cancels out the torque that would otherwise be generated by the rotational inertia. Automatic computer monitoring by a programmed redundant digital Autopilot Computer controls pitch, bank, yaw and elevation, while simultaneously using on-board inertial sensors to maintain vehicle stability and restrict the flight regime that the pilot or route planning software can command, to protect the vehicle from inadvertent steep bank or pitch, or other potentially harmful acts that might lead to loss of control. Sensed parameter values about vehicle state are used to detect when recommended vehicle operating parameters are about to be exceeded. By using the feedback from vehicle state measurements to inform motor control commands, and by voting among redundant autopilot computers, the methods and systems contribute to the operational simplicity, stability, reliability and safety of the vehicle.

Among the many uses for this class of vehicle are the next generation of personal transportation including commuting, local travel, air taxi, and recreation where operators need not have the level of piloting skills necessary for more complex, traditional aircraft or helicopters. This evolution is referred to as Personal Air Vehicles (PAV) or Air Mobility Vehicles (AMV). The vehicle also has autonomous or unmanned application to aerial surveillance, security and reconnaissance, policing, and package or supplies delivery that will be of utility to law enforcement, border patrol, military surveillance, emergency relief aid (disaster recovery), and commercial users.

The vehicle is equipped with redundant Autopilot Computers to accept control inputs by the operator (using the tablet computer's motion to mimic throttle and joystick commands) and manage commands to the electric motor controllers, advanced avionics and GPS equipment to provide location, terrain and 'highway in the sky' displays, and a simplified, game-like control system that allows even casual users to master the system after a brief demonstration flight. A tablet-computer provides mission planning and vehicle control system capabilities to give the operator the ability to pre-plan a route and have the system fly to the destination via autopilot, or manually control thrust, pitch, roll and yaw through movement of the tablet computer itself. Control inputs can alternatively be made using a throttle for vertical lift (propeller RPM) control, and a joystick for pitch (nose up/down angle) and bank (angle to left or right) control, or a 3-axis joystick to combine pitch, bank and thrust in a single control element, depending on user preferences. The Motor Management Computer measures control inputs by the operator or autopilot directions, translates this into commands to the controllers for the individual electric motors according to a known performance table, then supervises motor reaction to said commands, and monitors vehicle state data (pitch, bank, yaw, pitch rate, bank rate, yaw rate, vertical acceleration, lateral acceleration, longitudinal acceleration, GPS speed, vertical speed air speed and other factors) to ensure operation of the vehicle remains within the desired envelop.

BRIEF DESCRIPTION OF THE DRAWINGS

The invention description below refers to the accompanying drawings, of which.

DETAILED DESCRIPTION

To provide an overall understanding, certain illustrative embodiments will now be described; however, it will be understood by one of skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

Figure 1:
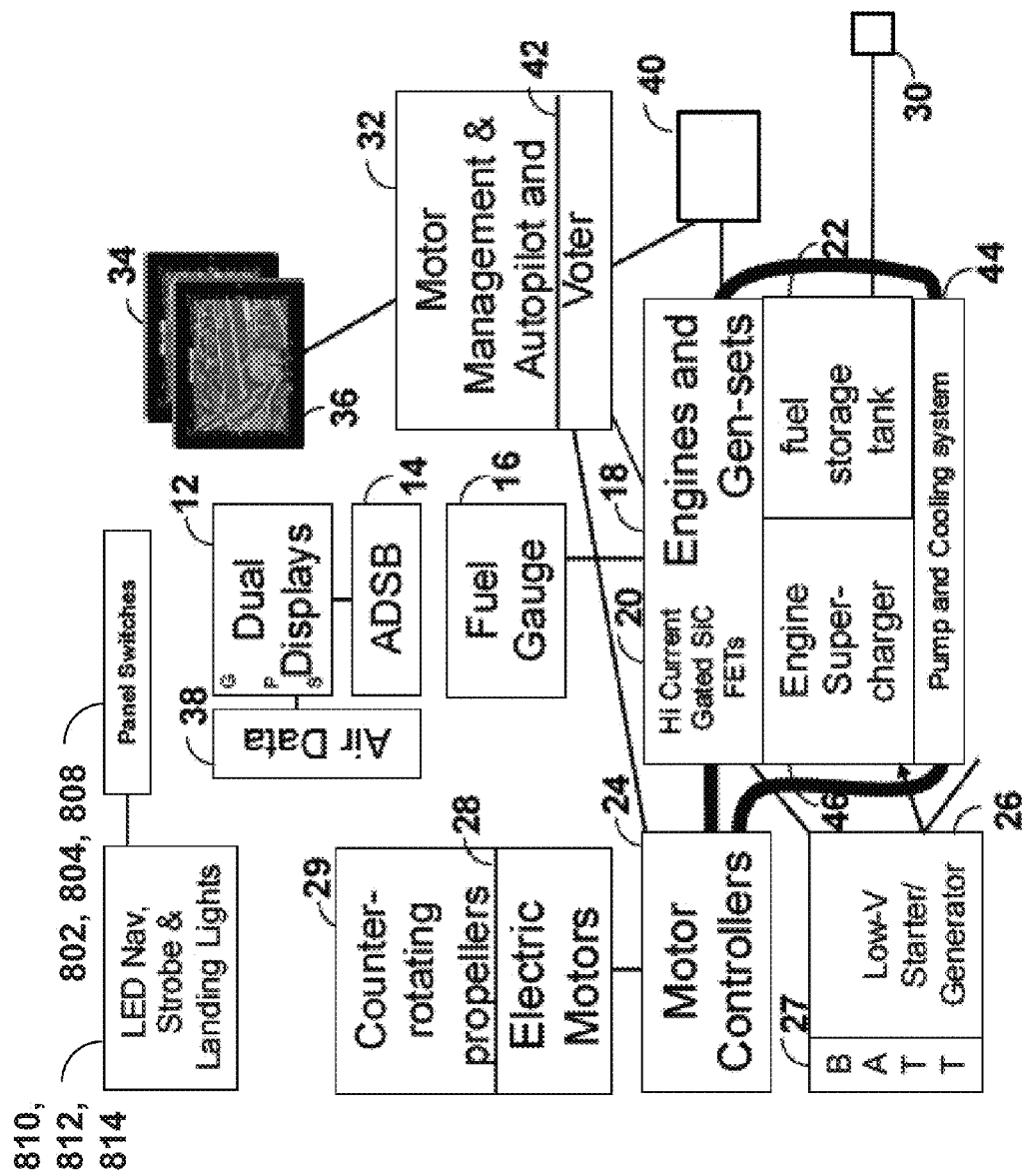
FIG. 1 shows a block diagram showing apparatus for practicing the present invention.

FIG. 1 depicts in block diagram form one type of system that may be employed to carry out the present invention's teachings. Here, this one- to two-person personal aerial vehicle (PAV) or unmanned aerial vehicle (UAV) includes on-board equipment such as a primary flight displays 12, an Automatic Dependent Surveillance-B (ADSB) transmitter/receiver 14, a global-positioning system (GPS) receiver typically embedded within 12, a fuel gauge 16, an air data computer to calculate airspeed and vertical speed 38, mission control tablet computers 36 and mission planning software 34, and redundant flight computers (also referred to as autopilot computers 32), all of which monitor either the operation and position of the aircraft or monitor and control the engines and generator-sets and fuel systems and provide display presentations that represent various aspects of those systems' operation and the aircraft's state data, such as altitude, attitude, ground speed, position, local terrain, recommended flight path, weather data, remaining fuel and flying time, motor voltage and current status, intended destination, and other information necessary to a successful and safe flight. The engine and generator set may readily be replaced by a hydrogen-powered Fuel Cell subsystem to generate electricity, where the fuel cell subsystem combines stored hydrogen with compressed air to generate electricity with a byproduct of only water and heat, thereby forming an engine and generator set or fuel cell 18. The engine and generator set or fuel cell 18 can also include a fuel pump and cooling system 44 and an engine supercharger 46 to optimize the efficiency and/or performance of the engine and generator set or fuel cell 18. As would be appreciated by one skilled in the art, the engine and generator set may also be replaced by a battery subsystem, consisting of high-voltage battery array, battery monitoring and charger subsystem, though such a configuration would not be fuel cell based. This disclosure is meant to address both kinds of power generation systems as well as stored-energy battery systems. For purposes of illustration, the present description focuses on a fuel cell form of electricity generation.

Vehicle state (pitch, bank, airspeed, vertical speed and altitude) are commanded a) by the operator using either a1) physical motions and commands made using the mission control tablet computers 36 as an input device; or a2) pre-planned mission routes selected and pre-programmed using the mission control tablets 36 and mission-planning software 34, or b) in UAV mode using pre-planned mission routes selected and pre-programmed using the mission control tablet computers 36 and mission-planning software 34. In either case, the mission control tablet computer 36 transmits the designated route or position command set to autopilot computers 32 and voter 42 over a serial datalink (in this example, using a repeating series of servo control pulses carrying the designated command information, represented by pulse-widths varying between 1.0 to 2.0 milliseconds contained within a 'frame' of, for example, 10 to 30 milliseconds). Multiple 'channels' of command data may be included within each 'frame', with the only caveat being that each maximum pulse width must have a period of no output (typically zero volts or logic zero) before the next channel's pulse can begin. In this way, multiple channels of command information are multiplexed onto a single serial pulse stream within each frame. The parameters for each pulse within the frame are that it has a minimum pulse width, a maximum pulse width, and a periodic repetition rate. The motor's RPM is determined by the duration of the pulse that is applied to the control wire. Note that the motor's RPM is not determined by the duty cycle or repetition rate of the signal, but by the duration of the designated pulse. The autopilot might expect to see a pulse every 20 ms, although this can be shorter or longer, depending upon system requirements. The width of each channel's pulse within the frame will determine how fast the corresponding motor turns. For example, anything less than a 1.2 ms pulse might be pre-programmed as 'Motor OFF' or 0 RPM, and pulse widths ranging from 1.2 ms up to 2.0 ms will proportionately command the motor from 20% RPM to 100% RPM. Given the physical constraints of the motor being controlled, the exact correlation between pulse width and resultant motor RPM will be a function of each system's programming.

The receiver at each autopilot then uses software algorithms to translate the received channel pulses correlating to channel commands from the tablet computer or alternate control means (in this example the set of pulse-widths representing the control inputs such as pitch, bank and yaw and rpm) into the necessary outputs to control each of the multiple (in this example six) motor controllers 24, motors, and propellers 29 to achieve the commanded vehicle motions. Commands might be transmitted by direct wire, or over a secure RF (wireless) signal between transmitter and receiver. The autopilot is also responsible for measuring other vehicle state information, such as pitch, bank angle, yaw, accelerations, and for maintaining vehicle stability.

The command interface between the autopilots and the multiple motor controllers 24 will vary from one equipment set to another, and might entail such signal options to each motor controller 24 as a variable DC voltage, a variable resistance, a CAN or other serial network command, an RS-232 or other serial data command, or a PWM (pulse-width modulated) serial pulse stream, or other interface standard obvious to one skilled in the art. Control algorithms operating within the autopilot computer 32 perform the necessary state analysis, comparisons, and generate resultant commands to the individual motor controllers 24 and monitor the resulting vehicle state and stability. A voting means 42 decides which two of three autopilot computers 32 are in agreement, and automatically performs the voting operation to connect the proper autopilot computer 32 outputs to the corresponding motor controllers 24.

In an alternate control embodiment, the commanded vehicle motion and engine rpm commands could also be embodied by a pair of joysticks and a throttle, similar to those used to control radio-controlled aircraft, or even by a traditional sidearm controller and throttle, similar to an automotive foot pedal, where the joysticks/sidearm controller and throttle provide readings (which could be potentiometers, hall-effect sensors, or rotary-variable differential transformers (RVDT)) indicative of commanded motions which may then be translated into the appropriate message format and transmitted to the autopilot computers 32, and thereby used to control the multiple motors and propellers 29. The sidearm controller or joystick could also be embodied in a 'steering wheel' or control yoke capable of left-right and fore-aft motion, where the 2-axis joystick or control yoke provides two independent sets of single- or dual-redundant variable voltage or potentiometer settings indicative of pitch command (nose up or nose down) and bank command (left side up or left side down).

Motors of the multiple motors and propellers 29 in the preferred embodiment are brushless synchronous three-phase AC or DC motors, capable of operating as an aircraft motor, and that are either air-cooled or liquid cooled or both.

Throughout all of the system operation, controlling and operating the vehicle is performed with the necessary safety, reliability, performance and redundancy measures required to protect human life to accepted flight-worthiness standards.

Figure 9:
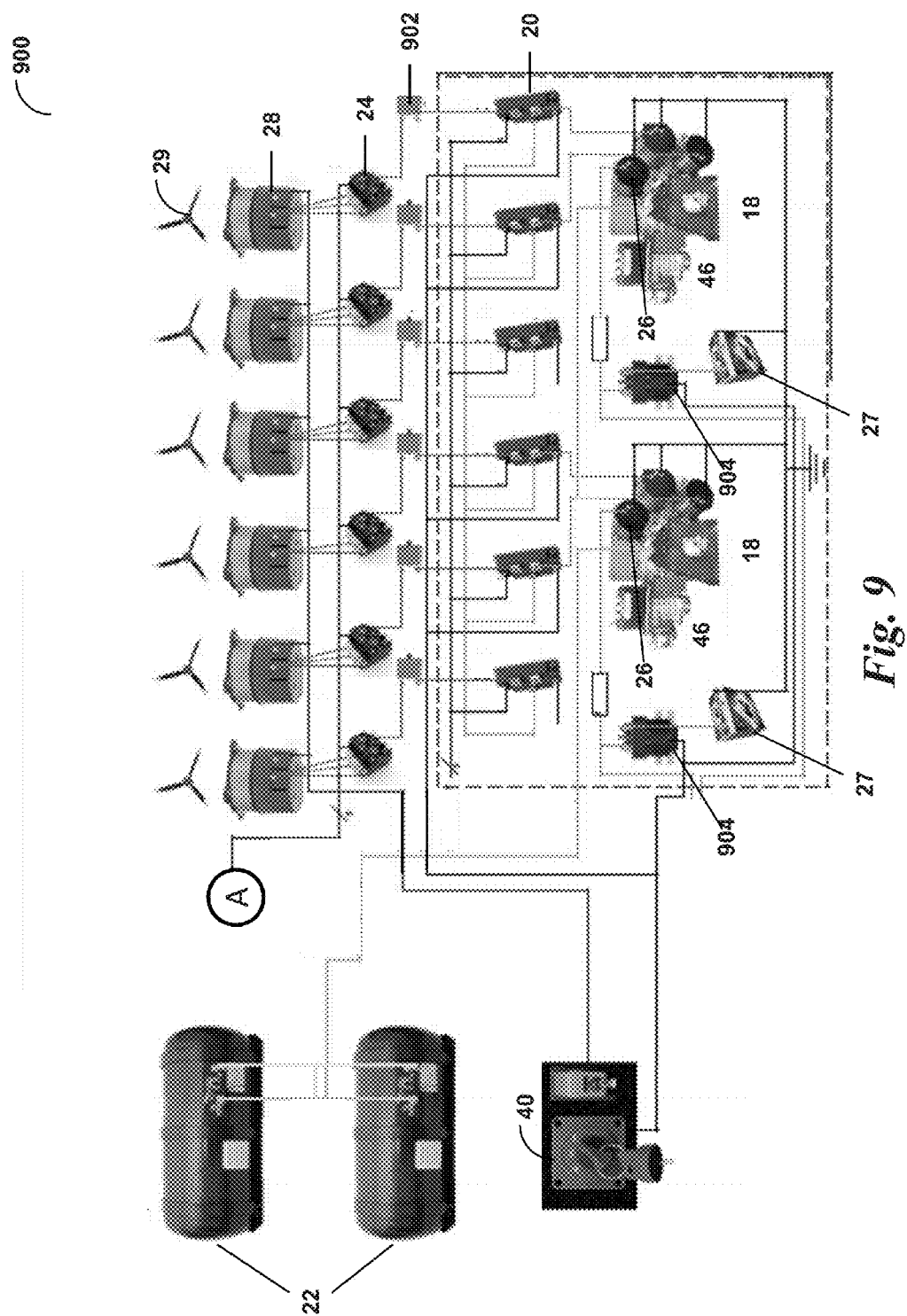
FIG. 9 shows electrical and systems connectivity of various motor control components of a system of the invention.

Electrical energy to operate the vehicle is derived from the engine-generator sets or fuel cells 18, which provide voltage and current to the motor controllers 24 through high-current diodes or Field Effect Transistors (FETs) 20 and circuit breakers 902 (shown in greater detail in FIG. 9). High current contactors 904 are engaged and disengaged under control of the vehicle key switch 40, similar to a car's ignition switch, which applies voltage to the starter/generator 26 to start the engine-generators and produce electrical power. For example, the high current contactors 904 are essentially large vacuum relays that are controlled by the vehicle key switch 40 and enable the current to flow to the starter/generator 26. In accordance with an example embodiment of the present invention, the starter/generator 26 also supplies power to the avionic systems of the aircraft. The motor controllers 24 each individually manage the necessary voltage and current to achieve the desired RPM and torque (collectively, thrust) produced by each motor and propeller combination 28. The number of motor controllers 24 and motor/propeller combinations 28 per vehicle may be as few as 6, and as many as 16 or more, depending upon vehicle architecture, desired payload (weight), fuel capacity, electric motor size, weight, and power, and vehicle structure. Advantageously, implementing a multirotor vehicle having a plurality of independent motor controllers 24 and motors, allows the use of smaller motors with lower current demands, such that fuel cells can produce the necessary voltage and current at a total weight for a functional aviation vehicle while achieving adequate flight durations.

The engines and generator sets or fuel cells 18 are fed by on-board fuel storage 22. The ability to refuel the multirotor aircraft's tanks at the origin, at the destination, or at roadside refueling stations is fundamental to the vehicle's utility and acceptance by the commuting public. Advantageously, the ability to refuel the fuel storage tanks to replace the energy source for the motors reduces the downtime required by conventional all electric vehicles (e.g., battery operated vehicles). Variations are included that will operate from Compressed Natural Gas (CNG), Liquid Petroleum Gas (LPG), AvGas (typical aviation fuel), and/or Hydrogen (for the fuel-cell versions). As would be appreciated by one skilled in the art, the engine and generator sets 18 can be powered by LPG, CNG, or AvGas fuel, or fuel cells 18 can be powered by hydrogen. Accordingly, the engine and generator sets or fuel cells 18 can create electricity from fuel to provide power to the motors on the multirotor aircraft. Advantageously, the use of engine and generator sets or fuel cells 18 are more weight efficient than batteries and store a greater energy density than existing Li ion batteries, thereby reducing the work required by the motors to produce lift. Additionally, the use of hydrogen fuel cells, LPG, CNG, or AvGas reduces the amount of work required by the motors due to the reduced weight as the fuel 30 is consumed.

Due to the nature of the all-electric multirotor vehicle, it is also possible to carry an on-board high-voltage battery and recharging subsystem in place of engine and generator sets or fuel cells 18, with an external receptacle to facilitate recharging the on-board batteries. In some instances it may also be desirable to operate the vehicle at the end of an electrical and data tether, for long-duration unmanned airborne surveillance, security or other applications. In this situation, power would be replenished or provided via the tether cable, and control information could be provided either by onboard systems as described herein, or by bidirectional wired or broadband or wireless or RF networks operated by ground controllers.

Power to operate the vehicle's avionics 12, 14, 16, 32, 34, 36, 38 and support lighting is provided by either a) a low-voltage starter-generator 26 powered by the engine and generator sets or fuel cells 18 and providing power to avionics battery 27, or b) a DC to DC Converter providing energy to Avionics Battery 27. If the DC to DC Converter is used, it draws power from high-voltage produced by the engine and generator sets or fuel cells 18 and down-converts the higher voltage, typically 300V DC to 600 VDC in this embodiment, to either 24V or 28V standards, either of which are voltages typically used in small aircraft systems. Navigation, Strobe and Landing lights draw power from 26 and 27, and provide necessary aircraft illumination for safety and operations at night under US and foreign airspace regulations. Suitable circuit breaker 902 and switch means are provided to control these ancillary lighting devices as part of the overall system.

Pairs of motors for the multiple motors and propellers 29 are commanded to operate at different RPM settings to produce slightly differing amounts of thrust under autopilot control, thus imparting a pitch moment, or a bank moment, or a yaw moment, or a change in altitude, or simultaneously all of the above to the aircraft, using position feedback from the autopilot's 6-axis inertial sensors to maintain stable flight attitude. Sensor data is read by each autopilot to assess its physical motion and rate of motion, which is then compared to commanded motion in all three dimensions to assess what new motion commands are required.

Of course, not all aircraft will employ the same mix of avionics, instrumentation or controllers or motors, and some aircraft will include equipment different from this mix or in addition to this mix. Not shown for example are radios as may be desirable for communications or other small ancillary avionics customary in general aviation aircraft of this size. Whatever the mix is, though, some set of equipment accepts input commands from an operator, translates those input commands into differing thrust amounts from the pairs of counter-rotating motors and propellers 29, and thus produces pitch, bank, yaw, and vertical motion of the aircraft using electric motors. When combined with avionics, instrumentation and display of the aircraft's current and intended location, the set of equipment enables the operator to easily and safely operate and guide the aircraft to its intended destination.

Figure 2:
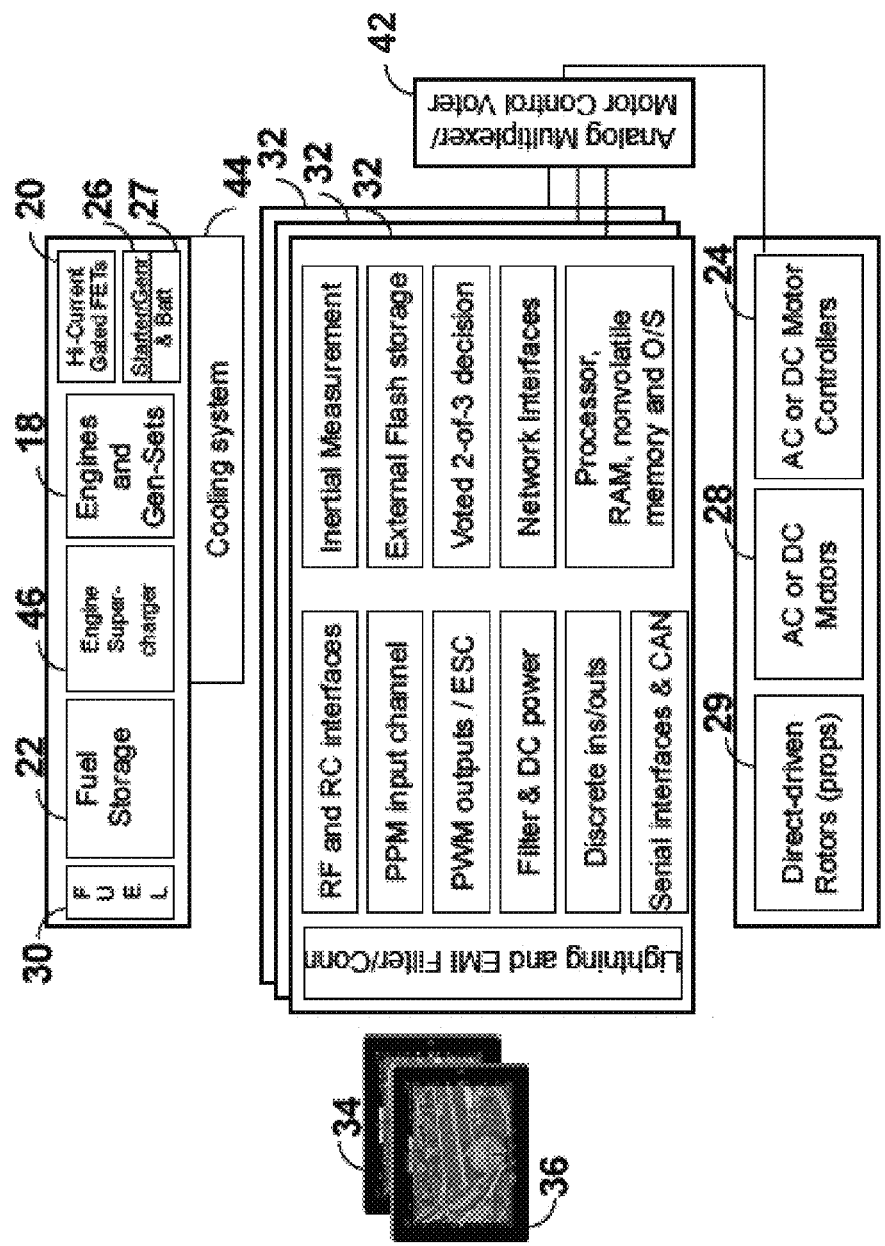
FIG. 2 shows a detailed block diagram, detailing the key features of the redundant Motor Management Computer and voting in relation to the overall system.

The autopilot computer 32 is embodied in a microprocessor-based circuit and includes the various interface circuits required to communicate with the aircraft's data busses, multi-channel servo controllers (inputs) 35 and 37, and motor controller (outputs) 24, and to take inertial and attitude measurements to maintain stability. This is further detailed in FIG. 2. In addition, autopilot computer 32 may also be configured for automatic recording or reporting of aircraft position, aircraft state data, velocity, altitude, pitch angle, bank angle, thrust, and other parameters typical of capturing aircraft position and performance, for later analysis or playback. To accomplish these requirements, said autopilot contains an embedded air data computer (ADC) and embedded inertial measurement sensors, although these data could also be derived from small, separate stand-alone units. The autopilot may be operated as a single or dual controller, but for reliability and safety purposes, the preferred embodiment uses a triple redundant autopilot, where the units share information, decisions and intended commands in a co-operative relationship using one or more networks (two are preferred, for reliability and availability). In the event of a serious disagreement outside of allowable guard-bands, and assuming three units are present, a 2-out-of-3 vote determines the command to be implemented by the motor controllers 24, and the appropriate commands are automatically selected and transmitted to the motor controllers 24. The operator is not typically notified of the controller disagreement during flight, but the result will be logged so that the units may be scheduled for further diagnostics post-flight.

The mission control tablet computer 36 is typically a dual redundant implementation, where each mission control tablet computer 36 contains identical hardware and software, and a screen button designating that unit as 'Primary' or 'Backup'. The primary unit is used in all cases unless it has failed, whereby either the operator (if present) must select the 'Backup' unit through a touch icon, or an automatic fail-over will select the Backup unit when the autopilots detect a failure of the Primary. When operating without a formal pre-programmed route, the mission control tablet computer 36 uses its internal motion sensors to assess the operator's intent, and transmits the desired motion commands to the autopilot. In UAV mode, or in manned automatic mode, the mission planning software 34 will be used pre-flight to designate a route, destination, and altitude profile for the aircraft to fly, forming the flight plan for that flight. Flight plans, if entered into the Primary mission control tablet computer 36, are automatically sent to the corresponding autopilot, and the autopilots automatically cross-fill the flight plan details between themselves and the Backup mission control tablet computer 36, so that each autopilot computer 32 and mission control tablet computer 36 carries the same mission commands and intended route. In the event that the Primary tablet fails, the Backup tablet already contains the same flight details, and assumes control of the flight once selected either by operator action or automatic fail-over.

For motor control of the multiple motors and propellers 29, there are three phases that connect from each high-current controller to each motor for a synchronous AC or DC brushless motor. Reversing the position of any two of the 3 phases will cause the motor to run the opposite direction. There is alternately a software setting within the motor controller 24 that allows the same effect, but it is preferred to hard-wire it, since the designated motors running in the opposite direction must also have propellers with a reversed pitch (these are sometimes referred to as left-hand vs right-hand pitch, or puller (normal) vs pusher (reversed) pitch propellers, thereby forming the multiple motors and propellers 29. Operating the motors in counter-rotating pairs cancels out the rotational torque that would otherwise be trying to spin the vehicle.

In the illustrated embodiment, the operational analyses and control algorithms that will shortly be described are performed by the on-board autopilot computer 32, and flight path and other useful data are presented on the dual avionics displays 12. Various aspects of the invention can be practiced with a different division of labor; some or all of the position and control instructions can in principle be performed outside the aircraft, in ground-based equipment, by using a broadband or 802.11 Wi-Fi network or Radio Frequency (RF) data-link between the aircraft and the ground-based equipment.

For the illustrative embodiment of FIG. 1, the representation of the highway in the sky display may include, for example, wickets or goal-posts appearing to fade into the depth of the display screen, thereby signifying where the aircraft is intended to fly. Other combinations of display graphics and terrain representations, as well as audible signals may be used to convey this or other information and/or warnings to the operator in whatever manner is most effective. For example, combinations of graphical depictions or audible messages could be used to indicate that the aircraft is being asked to depart outside of certain predetermined "cruise" or "intended" conditions, while the Motor Management Computer makes adjustments so as not to violate those intended conditions. As will be seen below, operating the aircraft within "cruise" or "intended" conditions serves the purpose of protecting the aircraft and the operator from unintended deviations or departure from safe flight. The goal of the 'highway in the sky' presentation is to enable an operator to select their destination, and then use the tablet computer as an input device to drive or guide the vehicle along the prescribed path to the destination.

The combination of the avionics display system coupled with the ADSB capability enables the multirotor aircraft to receive broadcast data from other nearby aircraft, and to thereby allow the multirotor aircraft to avoid close encounters with other aircraft; to broadcast own-aircraft position data to avoid close encounters with other cooperating aircraft; to receive weather data for display to the pilot and for use by the avionics display system within the multirotor aircraft; to allow operation of the multirotor aircraft with little or no requirement to interact with or communicate with air traffic controllers; and to perform calculations for flight path optimization, based upon own-aircraft state, cooperating aircraft state, and available flight path dynamics under the National Airspace System, and thus achieve optimal or near-optimal flight path from origin to destination.

Figure 3:
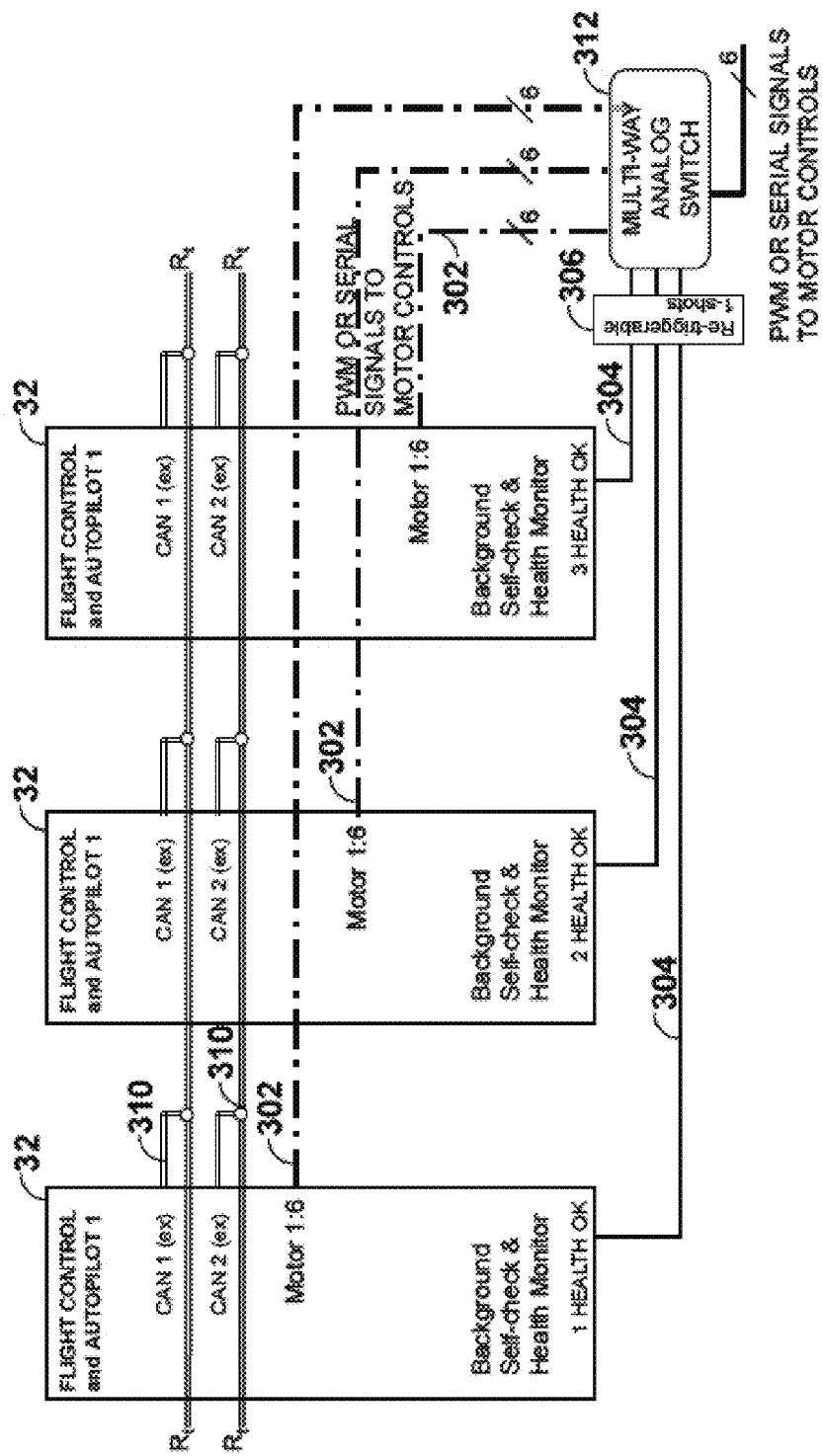
FIG. 3 shows a more detailed block diagram, focused on the fault-tolerant, triple-redundant voting control and communications means.

FIG. 3 is a diagram showing the voting process that is implemented to perform the qualitative decision process. Since there is no one concise 'right answer' in this real-time system, the autopilot computers 32 instead share flight plan data and the desired parameters for operating the flight by cross-filling the flight plan, and each measures its own state-space variables that define the current aircraft state, and the health of each Node. Each node independently produces a set of motor control outputs 314 (in serial PWM format in the described embodiment), and each node assesses its own internal health status. The results of the health-status assessment are then used to select which of the autopilots actually are in control of the motors of the multiple motors and propellers 29.

The voting process is guided by the following rules:
Each autopilot node (AP) 32 asserts "node ok" 304 when its internal health is good, at the start of each message. Messages occur each update period, and provide shared communications between AP's.
Each AP de-asserts "node ok" if it detects an internal failure, or its internal watchdog timer expires (indicating AP failure), or it fails background self-test
Each AP's "node ok" signal must pulse at least once per time interval to retrigger a 1-shot 'watchdog' timer 306. If the AP's health bit does not pulse, the watchdog times out and the AP is considered invalid.

Each AP connects to the other two AP's over a dual redundant, multi-transmitter bus 310. This may be a CAN network, or an RS-422/423 serial network, or an Ethernet network, or similar means of allowing multiple nodes to communicate.

The AP's determine which is the primary AP based on which is communicating with the cockpit primary tablet.

The primary AP receives flight plan data or flight commands from the primary tablet.

The AP's then crossfill flight plan data and waypoint data between themselves using the dual redundant network 310. This assures each autopilot (AP) knows the mission or command parameters as if it had received them from the tablet.

In the cockpit, the backup tablet receives a copy of the flight plan data or flight commands from its crossfilled AP.

Each AP then monitors aircraft state vs commanded state to ensure the primary AP is working, within an acceptable tolerance or guard-band range. Results are shared between AP's using the dual redundant network 310.

Motor output commands are issued using the PWM motor control serial signals 314, in this embodiment. Other embodiments have also been described but are not dealt with in detail here. Outputs from each AP pass through the voter 312 before being presented to each motor controller 24.

If an AP de-asserts its health bit or fails to retrigger its watchdog timer, the AP is considered invalid and the voter 312 automatically selects a different AP to control the flight based on the voting table.

The new AP assumes control of vehicle state and issues motor commands to the voter 312 as before.

Each AP maintains a health-status state table for its companion AP's. If an AP fails to communicate, it is logged as inoperative. The remaining AP's update their state table and will no longer accept or expect input from the failed or failing AP Qualitative analysis is also monitored by the AP's that are not presently in command.

Each AP maintains its own state table plus 2 other state tables and an allowable deviation table.

The network master issues a new frame to the other AP's at a periodic rate, and then publishes its latest state data.

Each AP must publish its results to the other AP's within a programmable delay after seeing the message frame, or be declared invalid.

If the message frame is not received after a programmable delay, node 2 assumes network master role and sends a message to node 1 to end its master role.

Note that the redundant communication systems are provided in order to permit the system to survive a single fault with ne degradation of system operations or safety.

Figure 4:
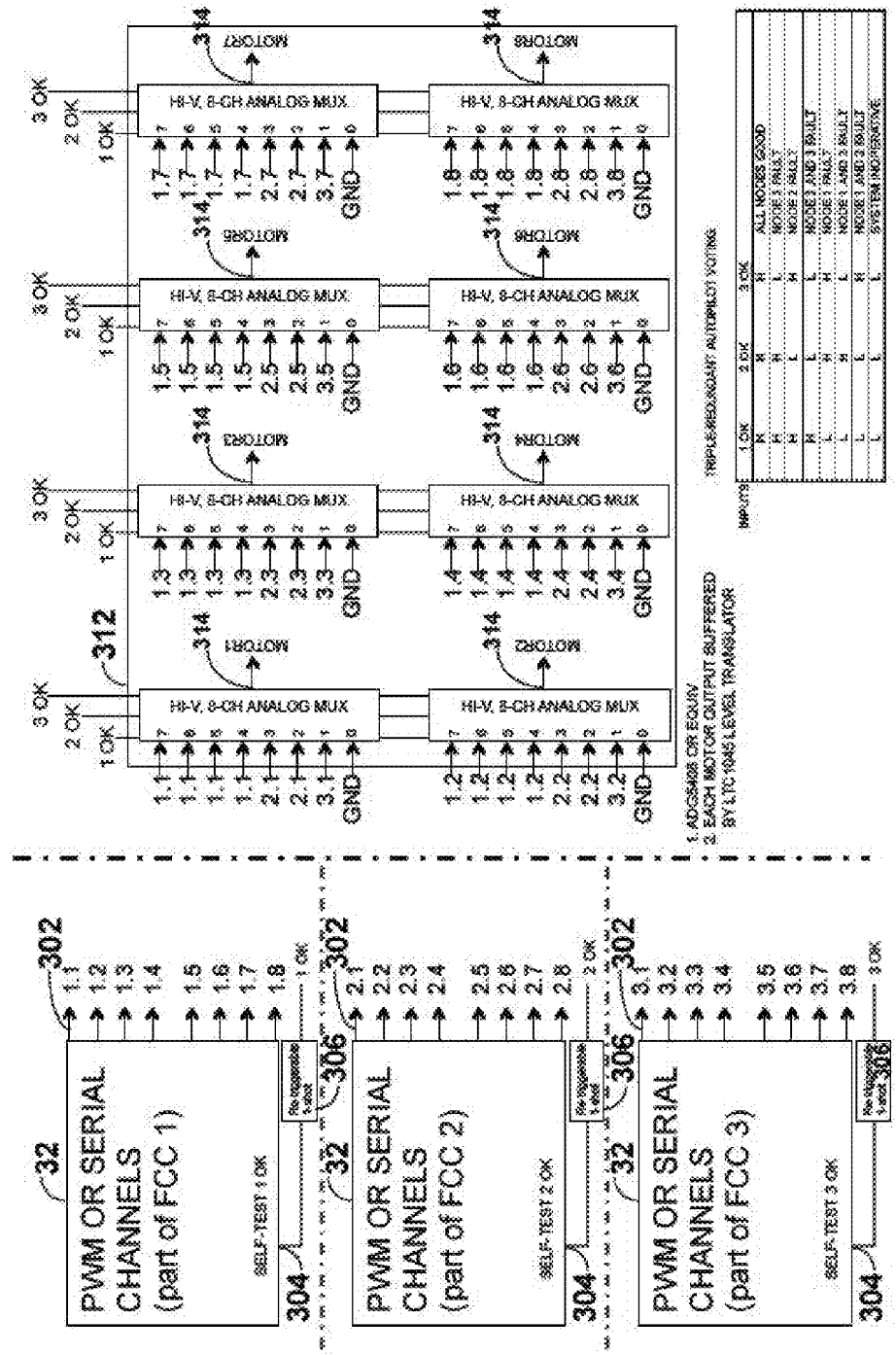
FIG. 4 illustrates one way in which the multiple (typically one per motor plus one each for any other servo systems) command stream outputs from the three autopilot computers can be voted to produce a single set of multiple command streams, using the system's knowledge of each autopilot's internal health and status.

Multi-way analog switch 312 monitors the state of 1.OK, 2.OK and 3.OK and uses those 3 signals to determine which serial signal set 302 to enable so that motor control messages 314 may pass between the controlling node and the motor controllers 24. This motor controller 24 serial bus is typified by a PWM pulse train in the preferred embodiment, although other serial communications may be used such as RS-232, CAN, or a similar communications means. In a preferred embodiment, the PWM pulse train is employed; with the width of the PWM pulse on each channel being used to designate the percent of RPM that the motor controller 24 should achieve. This enables the controlling node to issue commands to each motor controller 24 on the network. FIG. 4 provides additional detail on the voting and signal switching mechanism in one embodiment of the technique.

Figure 5:
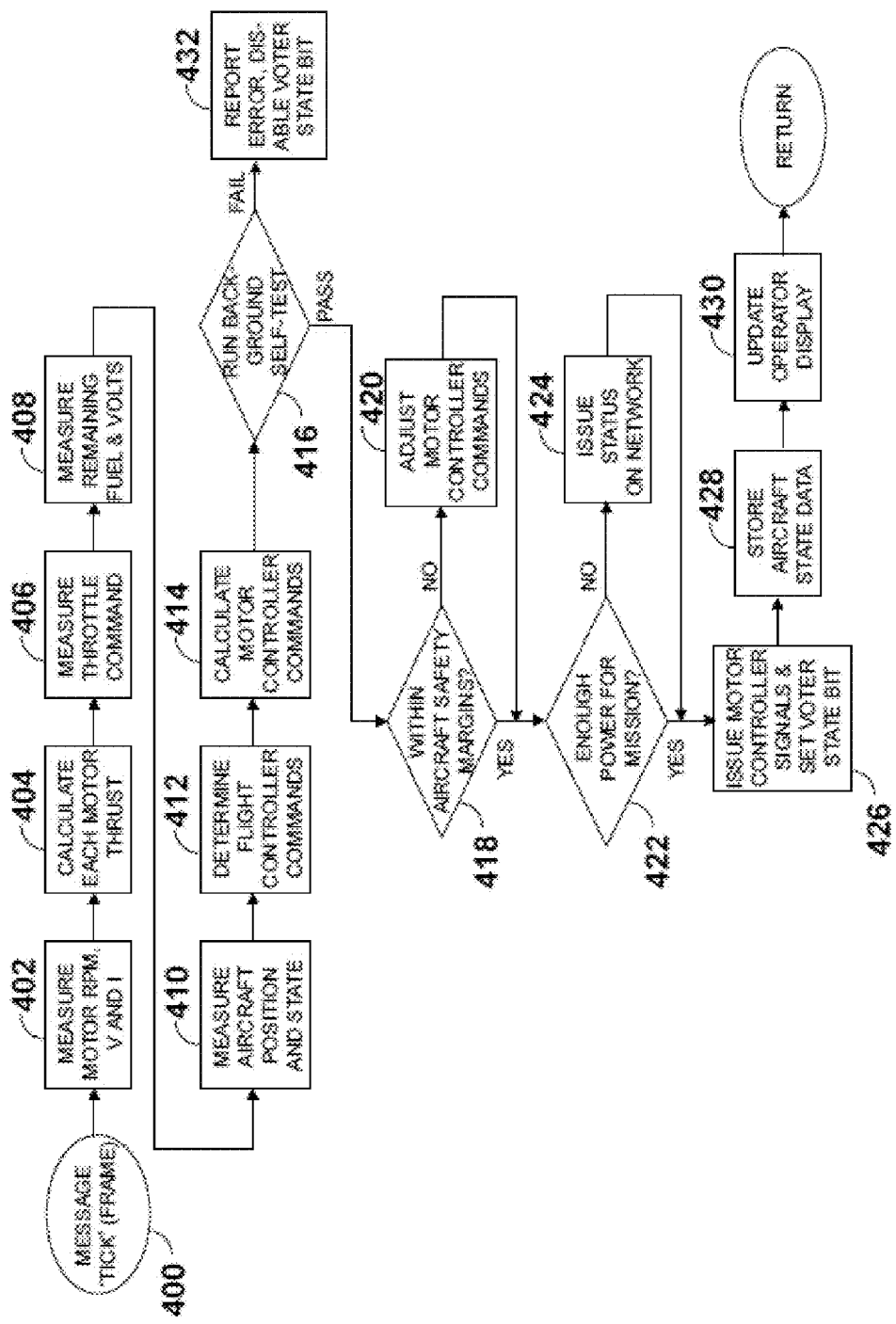
FIG. 5 shows a flow chart that illustrates the present invention in accordance with one example embodiment.

FIG. 5 is a flowchart that depicts in simplified form a measurement-analysis-adjustment-control approach that some embodiments of the invention may employ. The system enters the routine 400 periodically, at every "tick" of a periodic system frame as initiated by the controlling AP via an output message. The frequency at which this occurs is selected to be appropriate to the parameters being sensed and the flight dynamics of the vehicle, and in some cases the frequencies may be different for different measurements. For the sake of simplicity, though, the frequency is the same for all of them, and, for the sake of concreteness, we apply an oversampling frequency of forty times per second or every 25 milliseconds, more or less.

As block 402 in FIG. 5 indicates, the system first takes measurements of various sensor outputs indicative of each motor's performance of the multiple motors and propellers 29, including propeller RPM, motor voltage, motor current and (if available) temperature. In this system, such measurement data may be readily accessed through each motor controller's 24 serial data busses, and the illustrated embodiment selects among the various available measurement parameters that can be obtained in this manner.

With the motor data thus taken, the system performs various analyses, as at block 404, which may be used to calculate each motor's thrust and contribution to vehicle lift and attitude. Block 406 then measures the throttle command, by detecting where the tablet throttle command or throttle lever has been positioned by the operator and notes any change in commanded thrust from prior samples.

Block 408 measures the voltage, current drawn, and estimated remaining fuel 30. This data is then used as part of the analysis of remaining flight duration for the trip or mission underway and is made available to the operator.

As block 410 in FIG. 5 indicates, the autopilot computer 32 gathers a representative group of aircraft measurements from other embedded inertial sensors and (optionally) other onboard sensors including air data sensors, and GPS data derived by receiving data from embedded GPS receivers. Such measurements may include air speed, vertical speed, pressure altitude, GPS altitude, GPS latitude and GPS longitude, outside-air temperature (OAT), pitch angle, bank angle, yaw angle, pitch rate, bank rate, yaw rate, longitudinal acceleration, lateral acceleration, and vertical acceleration.

For some of the parameters, there are predetermined limits with which the system compares the measured values. These may be limits on the values themselves and/or limits in the amount of change since the last reading or from some average of the past few readings.

Block 412 then measures the tablet flight controller command, by detecting where the tablet has been positioned by the operator in two axis (pitch-bank) space and notes any change in commanded pitch-bank position from prior samples. If operating in pre-planned (UAV) mode, Block 412 assesses the next required step in the pre-planned mission previously loaded to the autopilot.

Block 414 then assimilates all of the vehicle state data and commanded data from the operator, and calculates the intended matrix of motor controller 24 adjustments necessary to accommodate the desired motions. Block 416 then executes the background health-status tests, and passes the command matrix on to block 418. If the background health-status test fails, Block 416 reports the error, and disables the voter 312 output state bit at Block 432. If the test itself cannot be run, the voter 312 output state bit(s) will cease to pulse, and the external watchdog will declare the failure of that controller, allowing another to take over through the external voter 312 action.

Block 418 in turn examines the intended matrix of commands, and assesses whether the intended actions are within the aircraft's safety margins. For example, if motor controller 3 is being commanded to output a certain current, is that current within the approved performance metrics for this aircraft. If not, block 420 makes adjustments to the matrix of motor controller 24 commands, and provides an indication to the Display to indicate that vehicle performance has been adjusted or constrained.

Similarly, Block 422 examines the intended matrix of commands, and assesses whether the electrical system and fuel tank contain sufficient power to accomplish the mission with margins and without compromising the overall success of the mission. For example, if all motor controllers 24 are being commanded to output a higher current to increase altitude, is that current available and can this be done without compromising the overall success of the mission. If not, block 424 makes adjustments to the matrix of motor controller 24 commands, and provides an indication to the Display to indicate that vehicle performance has been adjusted or constrained.

Block 424 then issues network messages to indicate its actions and status to the other autopilot nodes.

Block 426 then issues the commands to the motor controllers 24, and monitors their responses for correctness.

Block 428 then captures all of the available aircraft performance and state data and determines whether it is time to store an update sample to a non-volatile data storage device, typically a flash memory device or other form of permanent data storage. Typically samples are stored once per second, so the system need not perform the storage operation at every 100 millisecond sample opportunity.

Block 430 then provides any necessary updates to the operator Display, and returns to await the next tick, when the entire sequence is repeated.

When the flight is complete, the operator or his maintenance mechanic can then tap into the recorded data and display it or play it back in a variety of presentation formats. One approach would be for the onboard display apparatus to take the form of computers so programmed as to acquire the recorded data, determine the styles of display appropriate to the various parameters, provide the user a list of views among which to select for reviewing or playing back (simulating) the data, and displaying the data in accordance with those views. However, although the illustrated embodiment does not rely on ground apparatus to provide the display, this could also be accomplished by an off-board or ground display or remote server system. The system does so by utilizing a so-called client-server approach where the on-board apparatus (data server) prepares and provides web pages; the ground display apparatus requires only a standard web-browser client to provide the desired user interface.

Figure 6:
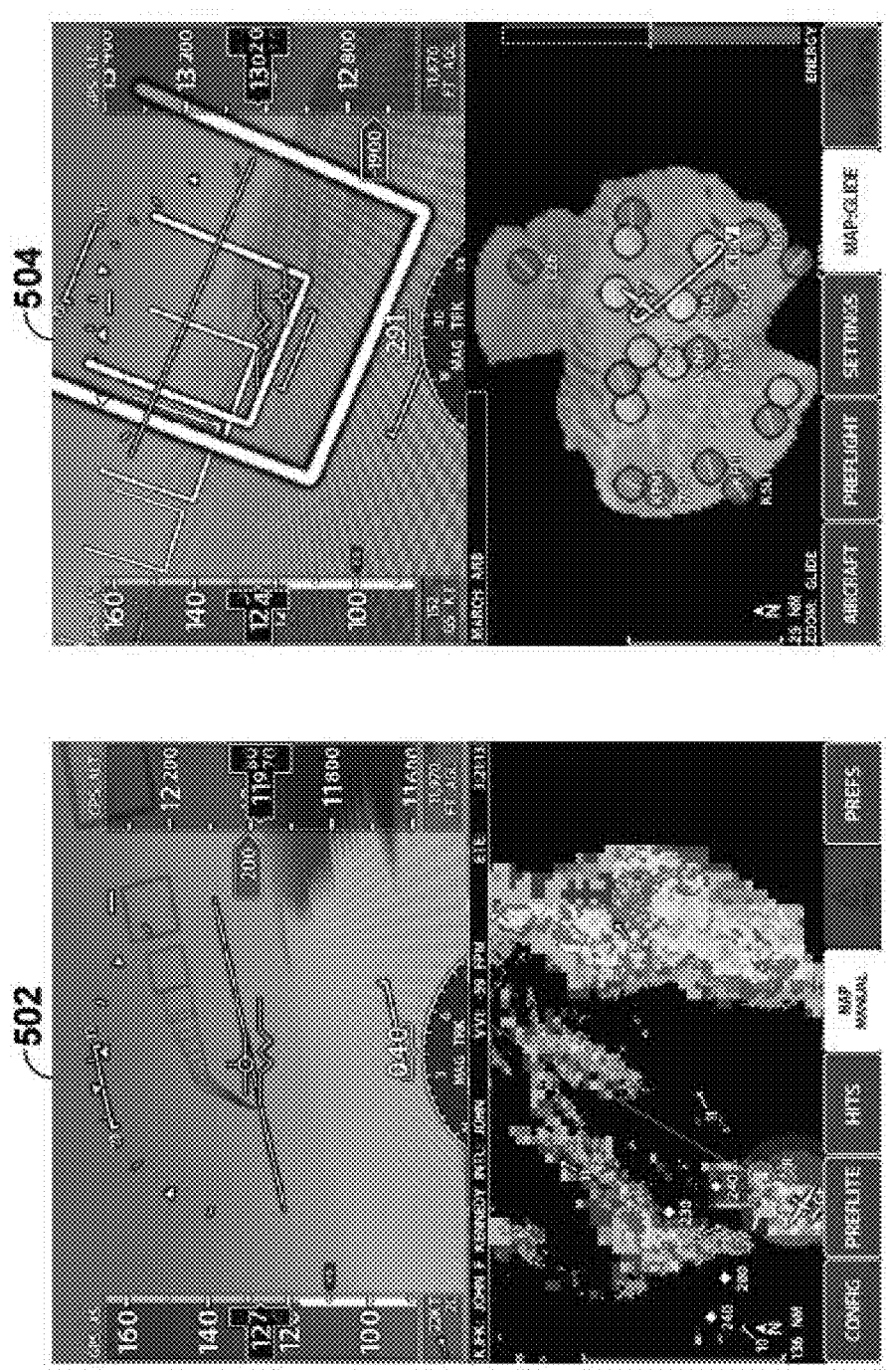
FIG. 6 shows an example of a type of $3^{rd}$-party display presentation used to present data necessary to the 'highway in the sky' operation of the system of FIG. 1.

FIG. 6 depicts one kind of display presentation 502 that can be provided to show weather data (in the bottom half) and highway in the sky data (in the top half). Also shown are the vehicle's GPS airspeed (upper left vertical bar) and GPS altitude (upper right vertical bar). Magnetic heading, bank and pitch are also displayed, to present the operator with a comprehensive, 3-dimensional representation of where the aircraft is, how it is being operated, and where it is headed. Other screens can be selected from a touch-sensitive row of buttons along the lower portion of the screen. Display presentation 504 is similar, but has added 'wickets' to guide the pilot along the flight path. The lower half of the screen illustrates nearby landing sites that can readily be reached by the vehicle with the amount of power on board. Said display is notionally a software package installed and operating on a 'tablet' computer, most probably an Apple iPad. The use of two identical iPads running identical display software allows the user to configure several different display presentations, and yet still have full capability in the event that one display should fail during a flight. This enhances the vehicle's overall safety and reliability.

In addition to providing a browser-based communications mode, the on-board system also enables stored data to be read in other ways. For example, the on-board storage may also be examined and/or downloaded using a web server interface. Typically, but not necessarily, the on-board storage contains the data in a comma-delimited or other simple file format easily read by employing standard techniques.

The memory device typically has enough capacity to store data for thousands of hours—possibly, the aircraft's entire service history—so maintenance personnel may be able to employ a ground-based display to show data not only for the most recent flight but also for some selection of previous data, such as the most-recent five flights, the previous ten flight hours, all data since the last overhaul, the last two hundred hours, or the entire service history, together with indications highlighting any anomalies.

The present invention's approach to multirotor vehicle operation and control, coupled with its onboard equipment for measuring, analyzing, displaying and predicting motor and controller items that can be adjusted, and for calculating whether the commanded motion is safe and within the vehicle's capabilities, can significantly enhance the safety and utility of this novel aircraft design, and reduce the probability of a novice operator attempting to operate outside of the vehicle's normal operational limits. It therefore constitutes a significant advance in the art. Similarly, the ability of the vehicle to operate under pre-planned mission parameters through a triple-redundant autopilot significantly enhances the safety and utility of this novel aircraft design, and protects the operator or payload to the greatest extent possible. The design is such that any single failure of a motor, controller, or autopilot or tablet is automatically managed and circumvented, to ensure the safe continued operation and landing of the vehicle.

Figure 7:
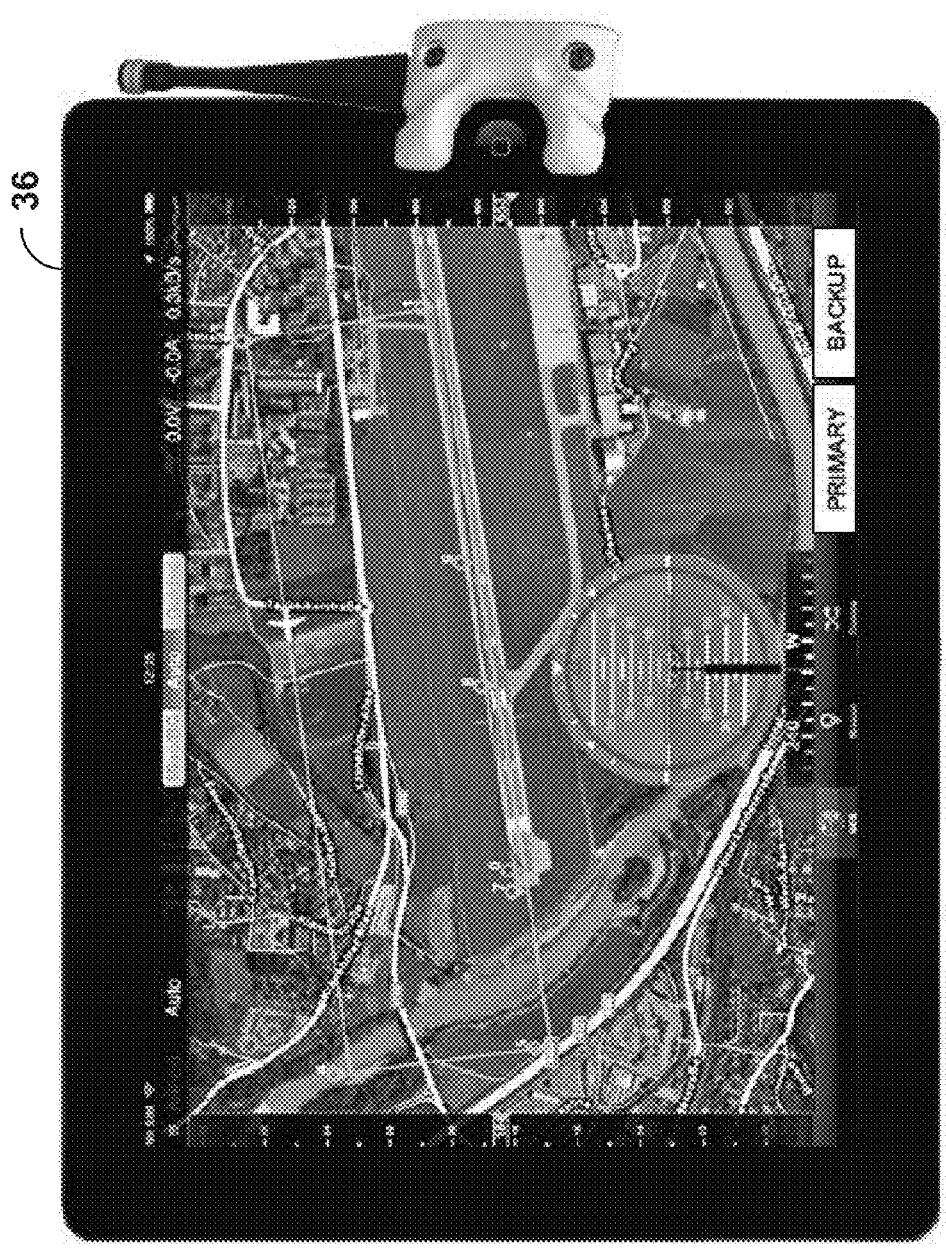
FIG. 7 shows an example of a mission control tablet computer used to plan the vehicle's route between origin and destination, using GPS coordinates and altitudes to implement waypoints, which provides data describing the route and mission to autopilot computers, which then implement the mission when authorized.

FIG. 7 shows the mission control tablet computer 36. This tablet and its software allow the operator to guide and control operation of the multi-copter by tilting the tablet, and adjusting throttle settings using a touch-slider. The software can be operated as Primary or Backup, in coordination with the triple-redundant autopilot software described previously.

Figure 8:
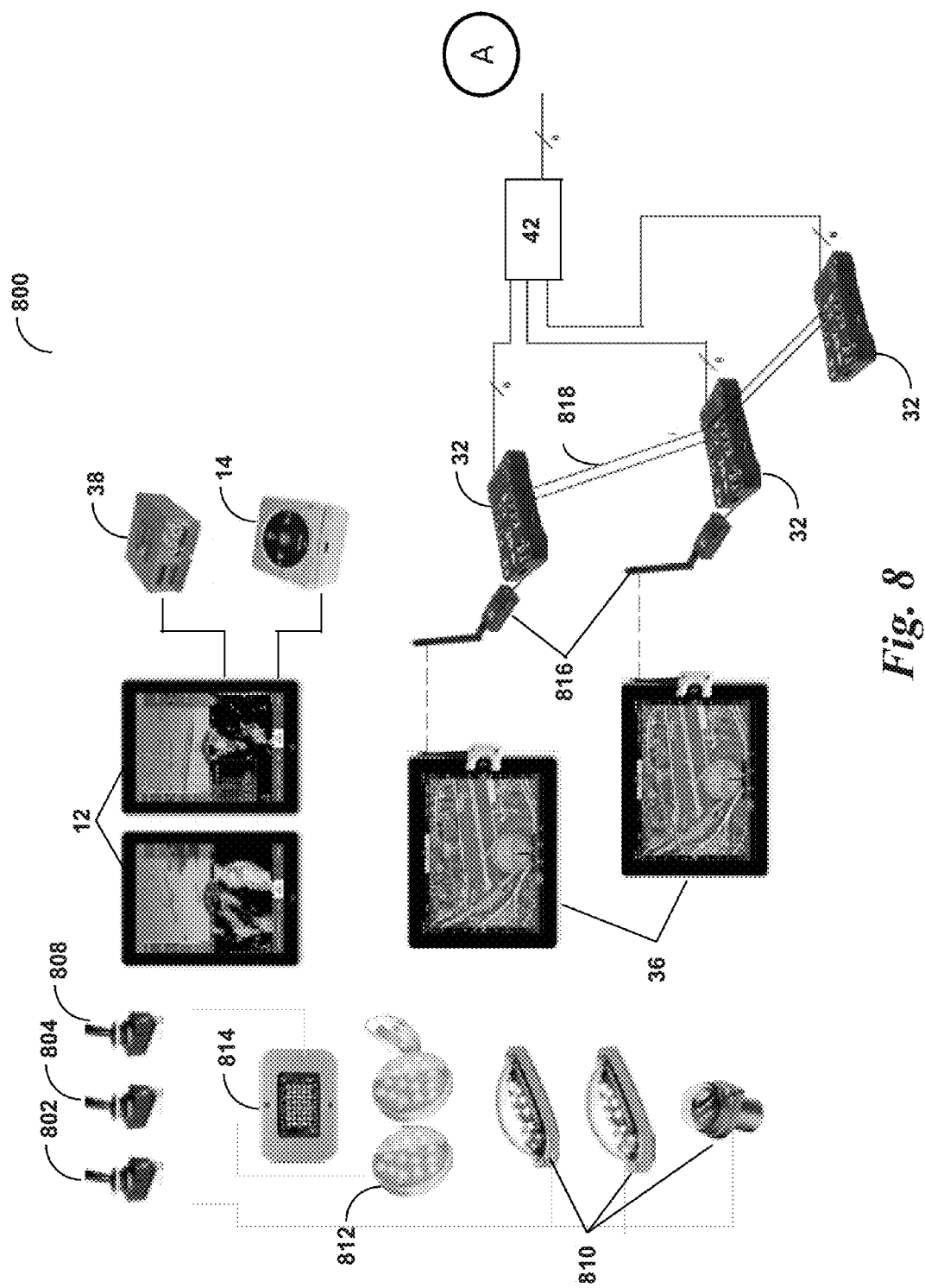
FIG. 8 shows electrical and systems connectivity of various control interface components of a system of the invention.

FIG. 8 shows electrical connectivity of components of the control interface 800 components, including the primary flight displays 12, the Automatic Dependent Surveillance-B (ADSB) transmitter/receiver 14, the air data computer to calculate airspeed and vertical speed 38, mission control tablet computers 36, and redundant autopilot computers 32, the controllers for navigation/strobe 802, landing lights 804, and for interior 808. As would be appreciated by one skilled in the art, the controller 802, 804, and 808 control nav-strobes/tailstrobe lights 810, landing lights 812, and interior lights 814, respectively. Continuing with FIG. 8, the control interface 800 components also include the redundant flight computers (e.g., autopilot computers 32) coupled via controllers to the eight motor controllers 24. In accordance with an example embodiment of the present invention, the mission control tablet computers 36 can communicate a route or position command set to the autopilot computers 12 using a serial datalinks 816. The autopilot computers 12 can pass one or more motor commands based on the route or position command set to the voter 42, as control signals. As would be appreciated by one skilled in the art, the autopilot computers 32 may communicate over a redundant communication network 818 during the voting process. Thereafter, the voter 42 can determine which signals to transmit to the motor controllers 24 based on the voting process, as discussed herein.

FIG. 9 shows electrical connectivity and fuel system 900 for the multirotor aircraft. The electrical connectivity includes six motor and propeller combinations 28 (of multiple motors and propellers 29) and the electrical components needed to supply the motor and propeller combinations with power. A high current contactor 904 is engaged and disengaged under control of the vehicle key switch 40, which applies voltage to the starter/generator 26 to start the engine and generator sets or fuel cells 18. In accordance with an example embodiment of the present invention, after ignition, the engine and generator sets or fuel cells 18 (e.g., one or more hydrogen-powered fuel-cells or hydrocarbon-fueled motors) create the electricity to power the six motor and propeller combinations 28 (of multiple motors and propellers 29). A power distribution and circuit breaker 902 subsystem autonomously monitors and controls distribution of the generated electrical voltage and current from the engine and generator sets or fuel cells 18 to the plurality of motor controllers 24. As would be appreciated by one skilled in the art, the circuit breaker is designed to protect each of the motor controllers 24 from damage resulting from an overload or short circuit. Additionally, the electrical connectivity and fuel system 900 includes diodes or FETs 20, providing isolation between each electrical source and an electrical main bus and the engine and generator sets or fuel cells 18. The diodes or FETs 20 are also part of the fail-safe circuitry, in that they diode-OR the current from the two sources together into the electrical main bus. For example, if one of the pair of the engine and generator sets or fuel cells 18 fails, the diodes or FETs 20 allow the current provided by the now sole remaining current source to be equally shared and distributed to all motor controllers 24. Such events would clearly constitute a system failure, and the autopilot computers 32 would react accordingly to land the aircraft safely as soon as possible. Advantageously, the diodes or FETs 20 keep the system from losing half its motors by sharing the remaining current. Additionally, the diodes or FETs 20 are also individually enabled, so in the event that one motor fails or is degraded, the appropriate motor and propeller combinations 28 (of multiple motors and propellers 29)(the counter-rotating pair) would be disabled. For example, the diodes or FETs 20 would disable the enable current for the appropriate motor and propeller combinations 28 (of multiple motors and propellers 29) to switch off that pair and avoid imbalanced thrust. In accordance with an example embodiment of the present invention, the six motor and propeller combinations 28 (of multiple motors and propellers 29) each include a motor and a propeller and are connected to the motor controllers 24, that control the independent movement of the six motors of the six motor and propeller combinations. As would be appreciated by one skilled in the art, the electrical connectivity and fuel system 900 may be implemented using 6, 8, 10, 12, 14, 16, or more independent motor controllers 24 and the motor and propeller combinations 28.

Continuing with FIG. 9, the electrical connectivity and fuel system 900 also depicts the redundant battery module system as well as components of the DC charging system. The electrical connectivity and fuel system 900 includes the fuel storage 22, the avionics battery 27, the fuel pump and cooling system 44, the engine supercharger 46, and a starter/alternator. The engines and generator sets or fuel cells 18 are fed by on-board fuel storage 22 and use the fuel 30 to produce a source of power for the motor and propeller combinations 28. As would be appreciated by one skilled in the art, the engine and generator sets or fuel cells 18 can include one or more hydrogen-powered fuel-cells or hydrocarbon-fueled motors and each engine can be fueled by compressed natural gas (CNG), liquefied petroleum gas (LPG), or aviation standard fuel 30 (avgas) and each fuel cell is powered by hydrogen or other suitable gaseous fuel 30.

Figure 10:
FIG. 10 shows a view of an aircraft in accordance with an embodiment of the present invention.
Figure 11:
FIG. 11 shows an alternate view of the truss structure the aircraft of FIG. 10.

FIG. 10 shows an aircraft 1000 in accordance with an embodiment of the present invention including a truss system 1010 and an aircraft body 1020, and FIG. 11 shows another view of the aircraft 1000 with an enlarged view of the truss system 1010 as coupled to the frame of the aircraft body 1020 shown in FIG. 10. In accordance with an example embodiment of the present invention, the multiple electric motors 24 are supported by the truss system 1010, and when the aircraft is elevated, the truss system 1010 supports (in suspension) the aircraft itself.

The methods and systems described herein are not limited to a particular aircraft or hardware or software configuration, and may find applicability in many aircraft or operating environments. For example, the algorithms described herein can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: a mission control tablet computer 32, mission planning software 34 program, throttle pedal, throttle arm, sidearm controller, yoke or control wheel, or other motion-indicating device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus in some embodiments be embedded in three identical devices that can be operated independently in a networked or communicating environment, where the network can include, for example, a Local Area Network (LAN) such as Ethernet, or serial networks such as RS232 or CAN. The network(s) can be wired, wireless RF, or broadband, or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices to perform the necessary algorithms and determine the appropriate vehicle commands, and if implemented in three units, the three units can vote among themselves to arrive at a 2 out of 3 consensus for the actions to be taken. As would be appreciated by one skilled in the art, the voting can also be carried out using another number of units (e.g., one two, three, four, five, six, etc.). For example, the voting can use other system-state information to break any ties that may occur when an even number of units disagree, thus having the system arrive at a consensus that provides an acceptable level of safety for operations.

The device(s) or computer systems that integrate with the processor(s) for displaying the highway in the sky presentations can include, for example, a personal computer with display, a workstation (e.g., Sun, HP), a personal digital assistant (PDA) or tablet such as an iPad, or another device capable of communicating with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application.

References to a network, unless provided otherwise, can include one or more networks, intranets and/or the internet.

Although the methods and systems have been described relative to specific embodiments thereof, they are not so limited. For example, the methods and systems may be applied to a variety of multirotor vehicles having 6, 8, 10, 12, 14, 16, or more independent motor controllers 24 and motors, thus providing differing amounts of lift and thus payload and operational capabilities. The system may be operated under an operator's control, or it may be operated via network or datalink from the ground. The vehicle may be operated solely with the onboard battery storage capacity, or it may have its capacity augmented by an onboard motor-generator or other recharging source, or it may even be operated at the end of a tether or umbilical cable for the purposes of providing energy to the craft. Obviously many modifications and variations may become apparent in light of the above teachings and many additional changes in the details, materials, and arrangement of parts, herein described and illustrated, may be made by those skilled in the art.

What is claimed is:

1. A full-scale, multirotor all-electric aircraft system sized, dimensioned, and configured for transporting one or more human occupants and payload, the system comprising:
    a multirotor airframe fuselage, having a structure supporting the total vehicle weight together with the one or more human occupants and payload;
    a multirotor upper truss structure connected to the multirotor airframe fuselage;
    a plurality of motor and propeller assemblies attached to the multirotor upper truss structure, the plurality of motor and propeller assemblies each comprising a plurality of pairs of counter-rotating propeller blades, the plurality of motor and propeller assemblies being controlled by a plurality of motor controllers;
    an electrical power-generating system comprising one of:
        a hydrogen fuel-cell system comprising a hydrogen storage tank, a plurality of fuel cell subsystems, one or more air-driven turbochargers supplying compressed air to the plurality of fuel cell subsystems, and a plurality of fuel cells supplying voltage and current to the plurality of motor controllers, wherein the hydrogen fuel-cell system combines hydrogen from the hydrogen storage tank with compressed air to generate electrical voltage and current; or
        a motor-generator system comprising a fuel storage tank, one or more hydrocarbon-fueled motors, and a plurality of motor-driven high voltage generators to supply current to said multirotor motor controllers;
    a power distribution and circuit breaker subsystem autonomously monitoring and controlling distribution of the generated electrical voltage and current to the plurality of motor controllers and an avionics system; and
    wherein the plurality of motor controllers are commanded by one or more autopilot control units, where the one or more autopilot control units control the commanded electrical voltage and torque or current for each of the plurality of motor and propeller assemblies and track the rotations per minute (RPM) and the torque produced or the current consumed at each of the plurality of motor and propeller assemblies.

2. The system of claim 1, wherein a source of power for the plurality of motor and propeller assemblies further comprises one or more hydrogen-powered fuel-cells or hydrocarbon-fueled motors with diode or field-effect transistor (FET) isolation between each electrical source and an electrical main bus and the one or more hydrogen-powered fuel-cells or hydrocarbon-fueled motors, where each engine is fueled by compressed natural gas (CNG), liquefied petroleum gas (LPG), or aviation standard fuel (avgas) and each fuel cell is powered by hydrogen or other suitable gaseous fuel.

3. The system of claim 1, further comprising controlling the plurality of motor and propeller assemblies to operate the multirotor all-electric aircraft system within predetermined aircraft performance limitations.

4. The system of claim 1, further comprising landing skids or wheels connected to the multirotor airframe fuselage supporting the multirotor all-electric aircraft system.

5. The system of claim 1, wherein the multirotor all-electric aircraft system is controlled within safety, reliability, performance, and redundancy measures necessary to protect human life to accepted FAA flight-worthiness standards.

6. The system of claim 1, wherein the plurality of motor controllers are high-voltage, high-current air-cooled or liquid-cooled controllers configured for up to 100 kW peak performance minimum.

7. The system of claim 1, wherein the multirotor all-electric aircraft system is operable autonomously and wherein some or all of the position and control instructions are performed outside the multirotor all-electric aircraft system, by using a broadband or 802.11 Wi-Fi network or Radio Frequency (RF) bidirectional data-link between the multirotor all-electric aircraft system and ground-based equipment.

8. The system of claim 1, wherein the multirotor all-electric aircraft system is operable autonomously and wherein some or all of the position and control instructions are performed inside the multirotor all-electric aircraft system, by using mission planning software to designate a route, destination, and altitude profile for the multirotor all-electric aircraft system to fly, forming the flight plan for that flight to be performed without human involvement.

9. The system of claim 1, wherein the electrical power-generating system further comprises multiple high-current battery cells mounted within modular enclosures of the multirotor airframe fuselage that require periodic charging while not in flight, comprising:
a battery management system configured to monitor battery voltage, current, charge, and status of the multiple high-current battery cells; and
a recharging system compatible with automotive electric vehicle recharging stations, according to J1772 standards;
wherein the multiple high-current battery cells are configured to recharge the multirotor aircraft's batteries at an origin, at a destination, or at roadside EV charging stations;
wherein the multiple high-current battery cells are configured to operate the multirotor all-electric aircraft system in a manned or unmanned local surveillance mode when 'tethered' by a power cable; and
wherein the electrical power-generating system uses a portion of the main generated power of the multirotor all-electric aircraft system to power onboard avionics through a DC-to-DC converter or starter-alternator, thereby alleviating a need for separate charger and charge-ports for batteries powering the onboard avionics.

10. The system of claim 1, further comprising:
an On/Off key connected to a high-current contactor that isolates the electrical power-generating system from the plurality of motor and propeller assemblies when power from the electrical power-generating system is not required;
a mission display system that displays to an operator information about a state of performance metrics of the electrical power-generating system;
a motor-enable safety switch providing a means of disabling and enabling the plurality of motor and propeller assemblies;
an external refueling connector compatible with infrastructure for electric powered vehicles, to enable aircraft system refueling;
a dual display system comprising software operating on a touch-tablet computer or avionics display system;
a dual mission controller tablet computer comprising the software operating on the touch-tablet computer or the avionics display system, with wired or wireless (RF) connections to the one or more autopilot control units;
a wirelessly connected or wire-connected Automatic Dependent Surveillance-Broadcast (ADSB) unit providing the software with collision avoidance, traffic, and weather information to and from the multirotor all-electric aircraft system;
one or more autopilot control units comprising a single-board computer and input/output interfaces comprising at least one of the following interfaces: serial RS232, Controller Area Network (CAN), Ethernet, analog voltage inputs, analog voltage outputs, pulse-width-modulated outputs for motor control, an embedded or stand-alone air data computer, an embedded or stand-alone inertial measurement device, and one or more cross-communication channels or networks;
a DC-DC converter or starter/alternator configured to down-shift at least a portion of a primary voltage of the multirotor all-electric aircraft system to either 24V or 28V standards for avionics and non-motor purposes, with a 24V or 28V battery to provide local current storage;
a tablet computer operating mission software, or a throttle or foot control pedal, providing a variable voltage or potentiometer setting indicative of commanded thrust;
a tablet computer operating mission software, or a 2-axis joystick or control yoke, providing two independent sets of variable voltage or potentiometer settings indicative of pitch command and bank command;
a means of combining pitch, roll, yaw, throttle, and other desired information onto a serial line, using servo controls, in such a way that multiple channels of command data pass from tablet to the one or more autopilot control units over the serial line, where control information is packaged in a plurality of frames that repeat at a periodic rate;
the one or more autopilot control units operating control algorithms generating commands to each of the plurality of motor controllers, managing and maintaining vehicle stability, and monitoring feedback.

11. The system of claim 10, wherein the avionics display system for the multirotor all-electric aircraft system comprises an interface to the ADSB unit, operable to:
receive broadcast data from nearby aircraft;
transmit desired state information to the one or more autopilot control units to avoid collisions with the nearby aircraft;
the one or more autopilot control units determine an action to command to avoid the collisions with the nearby aircraft;
broadcast position data of the multirotor all-electric aircraft system to the nearby aircraft to provide the nearby aircraft with the position information to avoid potential collisions;
receive weather data and display the weather data on the avionics display system;
enable operation of the multirotor all-electric aircraft system with no requirement to interact with or communicate with air traffic controllers; and
perform calculations for flight path optimization and collision avoidance, based upon a state of the multirotor all-electric aircraft, states of the nearby aircraft, and available flight path dynamics under the National Airspace System or equivalent systems in other countries.

12. The system of claim 1, wherein the plurality of motor and propeller assemblies comprise pancake, axial flux brushless synchronous three-phase AC or DC electric motors.

13. The system of claim 12, wherein the plurality of motor and propeller assemblies are an aircraft motor.

14. The system of claim 12, wherein the plurality of motor controllers and propeller assemblies provide lift or thrust forces predominantly in a vertical direction.

15. The system of claim 12, wherein pairs of propellers operate in counter-rotating fashion, so as to produce no net torque to the multirotor all-electric aircraft system, in such a way that a tail rotor is not necessary for stabilized and controlled rotary aircraft operation.

16. The system of claim 15, wherein pairs of the plurality of motor and propeller assemblies operate at different RPM or Torque settings to produce slightly differing amounts of thrust under computer control, thereby imparting a pitch moment, or a bank moment, or a yaw moment, or a change in altitude, or simultaneously combinations thereof, to the multirotor all-electric aircraft system, using position feedback from on-board inertial, atmospheric, global positioning system (GPS), and magnetic sensors to maintain flight stability.

17. A method for implementing an advanced fault tolerant control of a multirotor all-electric aircraft, comprising:
receiving, by at least one valid autopilot computing device communicating over a redundant network, a route or position command set from dual redundant pilot control tablets;
translating, by each available valid autopilot computing device of the at least one valid autopilot computing device, the received route or position command set into output commands to control multiple motor controllers, the translating comprising using control algorithms to generate the output commands for each of the multiple motor controllers;
voting on the output commands to be transmitted to the multiple motor controllers, by each of the at least one autopilot computing device, the voting comprising determining which of a majority of the output commands of the available valid autopilot computing device are in agreement; and
automatically transmitting the output commands determined majority vote to the multiple motor controllers.

18. The method as claimed in claim 17, wherein the method further includes the steps of:
receiving broadcast data from nearby aircraft;
transmitting new output commands to the available valid autopilot computing devices to avoid collisions with the nearby aircraft;
broadcasting position data of the multirotor all-electric aircraft to the nearby aircraft;
receiving weather data and displaying weather data on an avionics display system within the multirotor all-electric aircraft;
enabling operation of the multirotor all-electric aircraft without requiring interaction with or communication with air traffic controllers; and
performing calculations for flight path optimization and collision avoidance, based upon a state of the multirotor all-electric aircraft, states of the nearby aircraft, and available flight path dynamics under the National Airspace System.

19. A method for automated flight control and mission planning for operating a multirotor all-electric aircraft, comprising:
a plurality of autopilot computing devices receiving, from a tablet computing device, a route or position command set, comprising at least one of physical motion and command detected by the tablet computing device or a pre-planned mission route pre-programed into the tablet computing device;
the plurality of autopilot computing devices measuring and/or receiving multirotor all-electric aircraft real-time state information;
the plurality of autopilot computing devices translating the received route or position command set and the real-time state information into outputs to control multiple motor controllers of the multirotor all-electric aircraft;
the plurality of autopilot computing devices transmitting the outputs to the multiple motor controllers;
the plurality of autopilot computing devices measuring and/or receiving updated multirotor all-electric aircraft real-time state information;
the plurality of autopilot computing devices automatically assessing whether a new route or position command set is needed to maintain stability of the multirotor all-electric aircraft based on the updated real-time state information; and
the plurality of autopilot computing devices transmitting a new route or position command set to the multiple motor controllers.

20. The method of claim 19, further comprising:
maintaining a specified altitude of the multirotor all-electric aircraft, under command of the tablet computing device and the plurality of autopilot computing devices;
increasing or decreasing an altitude of the multirotor all-electric aircraft, under command of the tablet computing device and the plurality of autopilot computing devices;
maintaining a pitch, bank, and yaw angle of the multirotor all-electric aircraft, under command of the tablet computing device and the plurality of autopilot computing devices;
increasing or decreasing the pitch, bank, and yaw angles independently under command of the tablet computing device and the plurality of autopilot computing devices;
allowing an operator to fly a specified origin to destination route by following a display presentation;
allowing the operator or an unmanned vehicle to fly a pre-programmed origin to destination route and elevation profile by following a pre-programmed mission profile;
monitoring available electrical and fuel capacity to ensure available flight path dynamics adequate power remains for performing a flight to the specified origin to destination or the pre-programmed origin to destination; and
performing motor control algorithms within the plurality of autopilot computing devices.

21. The method of claim 20, wherein the real-time state information further comprises reading sensor data and assessing physical motion and rate of motion by each of the plurality of autopilot computing devices to be compared to commanded motion in all three dimensions to assess whether the new route or position command set is needed.

22. The method of claim 20, wherein the plurality of autopilot computing devices comprise a plurality of autopilot computing devices and employ voting node techniques to arrive at a majority decision for performing the motor control algorithms, thereby achieving reliability and safety requirements for the multirotor all-electric aircraft and improving fault tolerance.

* * * * *